US 6,702,182 B1

(12) United States Patent
Kanayama

(10) Patent No.: US 6,702,182 B1
(45) Date of Patent: Mar. 9, 2004

(54) IC CARD READER

(75) Inventor: Yasuhiro Kanayama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 40 days.

(21) Appl. No.: 09/787,257

(22) PCT Filed: Jul. 12, 2000

(86) PCT No.: PCT/JP00/04653

§ 371 (c)(1),
(2), (4) Date: Jun. 12, 2001

(87) PCT Pub. No.: WO01/06452

PCT Pub. Date: Jan. 25, 2001

(30) Foreign Application Priority Data

Jul. 16, 1999 (JP) .......................................... 11-203085

(51) Int. Cl.[7] .................................................. G06K 7/08
(52) U.S. Cl. ...................... 235/451; 235/380; 235/435; 235/479; 235/482; 235/481
(58) Field of Search ................................ 235/380, 435, 235/479

(56) References Cited

U.S. PATENT DOCUMENTS

| 4,040,097 A | * | 8/1977 | Mizuno ................ 235/61.11 X |
| 4,904,852 A | * | 2/1990 | Mita et al. ................... 235/479 |
| 5,463,210 A | * | 10/1995 | Imura ........................ 235/441 |
| 5,511,986 A | * | 4/1996 | Casey et al. ................ 439/188 |
| 5,686,714 A | * | 11/1997 | Abe et al. ................... 235/435 |
| 5,924,881 A | * | 7/1999 | Yasushi et al. ............. 439/188 |
| 5,929,414 A | * | 7/1999 | Saitoh ........................ 235/380 |
| 5,936,222 A | * | 8/1999 | Korsunsky et al. .......... 235/441 |
| 5,949,047 A | * | 9/1999 | Abe et al. ................... 235/435 |
| 6,013,345 A | * | 1/2000 | Koshida et al. ............... 428/78 |
| 6,149,064 A | * | 11/2000 | Yamaoka et al. ........... 235/479 |
| 6,203,330 B1 | * | 3/2001 | Buchholtz .................... 439/66 |

FOREIGN PATENT DOCUMENTS

| JP | 63-136184 | | 6/1988 |
| JP | 3006688 | | 11/1994 |
| JP | 8-171836 | | 8/1996 |
| JP | 409319838 A | * | 12/1997 |
| JP | 10-162684 | | 6/1998 |

OTHER PUBLICATIONS

Japanese search report for PCT/JP00/04653 dated Oct. 24, 2000.
English translation of Form PCT/ISA/210.

* cited by examiner

*Primary Examiner*—Karl D. Frech
*Assistant Examiner*—Daniel Walsh
(74) *Attorney, Agent, or Firm*—RatnerPrestia

(57) ABSTRACT

To present a highly reliable IC card reader for detecting when it is ready to communicate with an IC card by using a detection switch. In a main body unit, a torsion spring is thrust in a pushing direction of a detection switch button (OFF direction). In the presented switch mechanism, an IC contact point holder has a switch changeover bump, and when the bump moves to the inner side in cooperation with the move of the IC contact point holder, this bump abuts against the end portion of the torsion spring which is thrusting the detection switch button, and the end portion of the torsion spring is departed from the button.

3 Claims, 4 Drawing Sheets

IC CARD READER

This Application is a U.S. National Phase Application of PCT International Application PCT/JP/00/04653.

TECHNICAL FIELD

The present invention relates to a card reader for handling a card having magnetic stripes IC chips, and reading and writing information, and an electronic apparatus.

BACKGROUND ART

A conventional IC card reader comprises, as shown in FIG. 4, a card inlet 2 in which an IC card 13 is inserted, an IC contact point holder 3 which moves to the inner side of the IC card reader main body when the IC card 13 is inserted, and a detection switch 9 which detects when the IC card 13 settles home at specified position at the moving end position of the IC contact point holder 3. When the IC card 13 is inserted, an IC contact point 13a buried in the IC card 13 abuts against a contact 4 of the contact point holder 3 disposed inside the IC card reader. When the IC card is inserted further inside, the contact point holder 3a pushes a contact point switch button 9a, so that the detection switch is turned on. When the detection switch is turned on, the host side and IC card 13 are electrically connected, and information is exchanged between them.

When exchange of information is over between the host side and IC card 13 through the IC card reader, the IC card 13 is pulled out of the IC card reader.

At this time, since the IC contact point holder 3 is thrust to the IC card discharge side by a return spring 7 fitted to the IC contact point holder 3, the IC contact point holder 3 moves to the discharge side together with the IC card 13. At this time, the detection switch button 9a being pushed in by a rear end 12 of the IC contact point holder 3 returns to the state before insertion of the card (switch OFF).

In such conventional IC card reader, however, the detection switch 9 for detecting when it is ready to communicate as the IC cared 13 is inserted into the inner side of a guide path 1a of the card reader main body and the contact 4 fitted to the IC contact point holder 3 contacts with the IC contact point is disposed in a printed circuit board 10 or main body case 1. The detection switch 9 is turned on or of f by pushing in the button 9a by pressing a leaf spring of the switch in cooperation with the motion of the IC contact point holder 3 or IC card 13. Accordingly, the detection switch 9 may not be correctly turned on or off or the switch may be released due to fluctuation of insertion stopping position of the IC card 13, or fluctuation of repulsive force or setting height of the spring of the detection switch button 9a. As a result, the IC card 13 may not be read. Or when the IC card 13 is inserted quickly, a strong impact may be directly transmitted to the detection switch, and the switch may be broken or deviated in position.

SUMMARY OF THE INVENTION

The IC card reader in a first aspect of the invention comprises
an IC card reader main body having an IC card guide path in which an IC card is inserted,
an IC contact point holder for holding a contact point to contact with a contact point of the IC card, the IC contact point holder being disposed movably in the inner direction of the IC card reader main body, and
a detection switch for recognizing the contact between the IC contact point on the IC card and the contact point of the IC card reader side,
in which the detection switch is turned on or off by a bump provided on the IC contact point holder.

The IC card reader in a second aspect of the invention comprises
an IC card reader main body having an IC card guide path in which an IC card is inserted,
an IC contact point holder for holding a contact point to contact with a contact point of the IC card, the IC contact point holder disposed movably in the inner direction of the IC card reader main body,
a detection switch for recognizing the contact between the IC contact point on the IC card and the contact point of the IC card reader side, and
an elastic member for turning on or off the detection switch,
in which the IC contact point holder has a bump for releasing the elastic member abutting against the detection switch.

The IC card reader in a third aspect of the invention comprises
an IC card reader main body having an IC card guide path in which an IC card is inserted,
an IC contact point holder for holding a contact point to contact with a contact point of the IC card, the IC contact point holder being disposed movably in the inner direction of the IC card reader main body,
a detection switch for recognizing the contact between the IC contact point on the IC card and the contact point of the IC card reader side,
a switch button provided in the detection switch, and an elastic member provided in the IC card reader main body for thrusting the switch button into the detection switch,
in which the IC contact point holder has a bump for releasing the elastic member abutting against the switch button.

BEST MODE FOR CARRYING OUT THE INVENTION

A preferred embodiment of the invention is described below while referring to the accompanying drawings.

Figure 1:
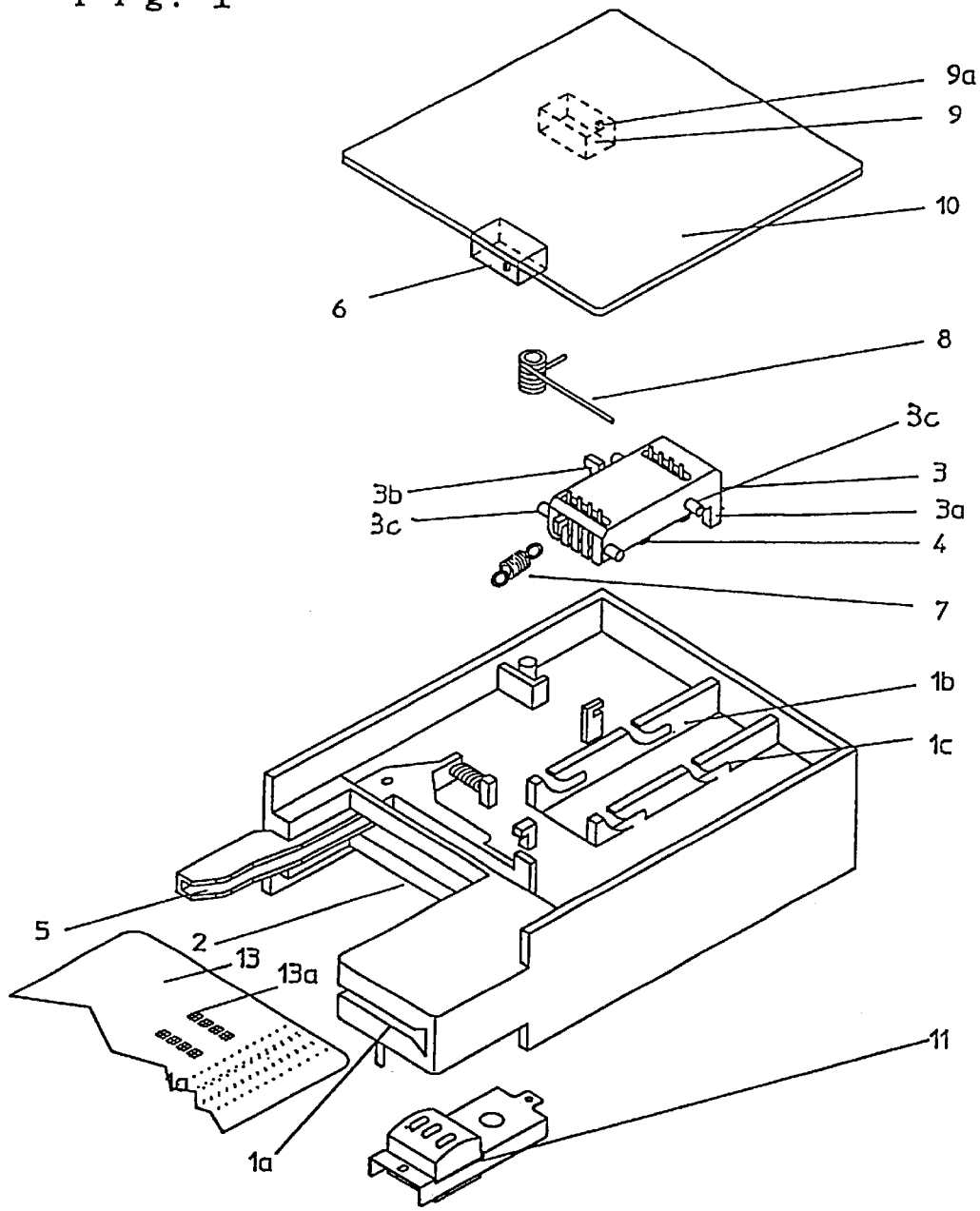
FIG. 1 is a perspective exploded view showing an embodiment of IC card reader of the invention.

In FIG. 1, the IC card reader comprises a card reader main body 1, a main body case guide groove 1a, a card inlet 2, an IC contact point holder 3, a contact point holder boss 3a, a switch changeover bump 3b, a contact 4, a card guide 5, a card detection switch 6, a return spring 7, a torsion spring 8 as elastic member, a detection switch 9, a printed circuit board 10, and a magnetic head mechanism 11.

In this configuration, the card reader main body 1 forms a card guide path 1a in which the card is inserted. The operation is explained in this configuration. An IC card 13 is inserted into the card inlet 2 of the IC card reader while spreading widely the card guide 5. The IC card 13 abuts against the contact point holder boss 3a projecting to the lower side of the IC contact holder 3, and is inserted into the position for reading and writing information in the IC card 13 together with the IC contact point holder 3 being thrust by the return spring 7. In the midst of this process, four guide bumps 3c provided at the side of the IC contact point holder 3 move along the guide groove 1b and 1c of the main body case as the main body 1, so that the contact point holder 3 is lowered.

When the contact 4 (in leaf spring structure) disposed in the IC contact point holder 3 abuts against the IC card 13 and is deflected, the contact 4 pushes the IC card 13 in the lower direction of the main body case 1, so that the IC card 13 is held at a specified position in the IC card reader.

Figure 2:
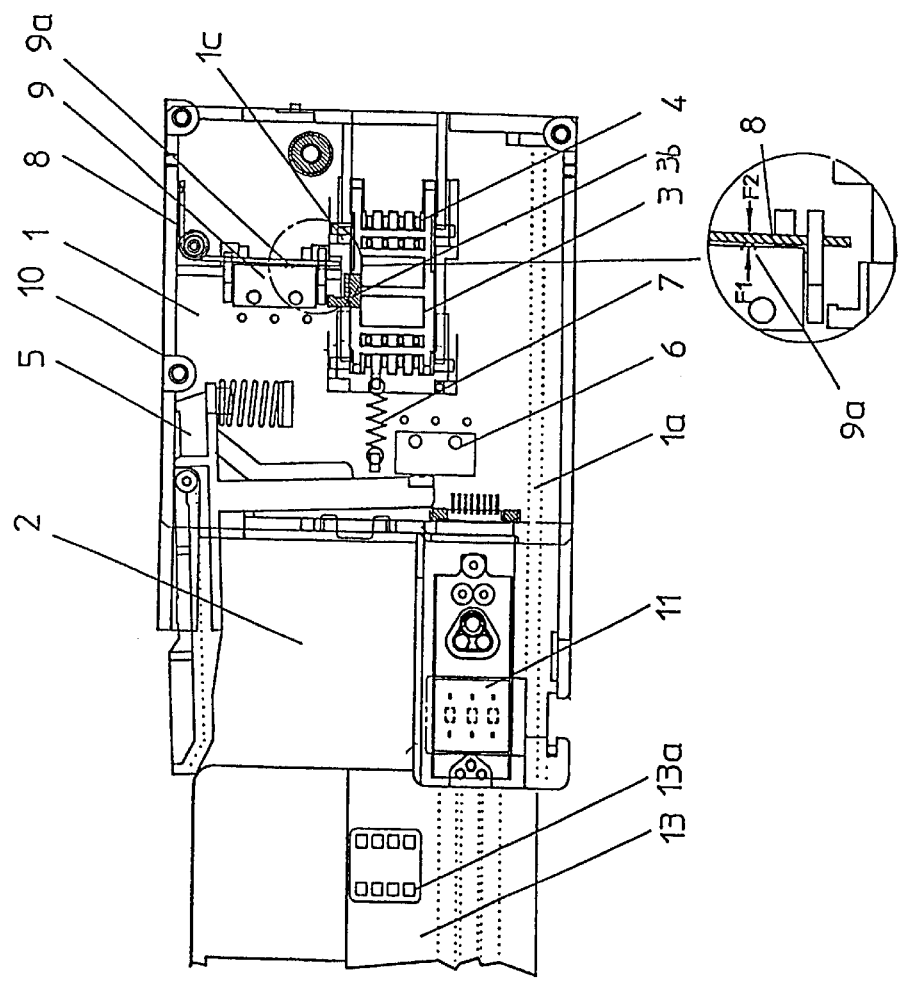
FIG. 2 is a front view showing a state before insertion of IC card in the embodiment of IC card reader of the invention.

FIG. 2 shows a state in which the IC card 13 is not inserted in the IC card reader. The switch changeover bump 3b of the IC contact point holder 3 is positioned in the direction of the card inlet 2 shifted from the place of installation of the detection switch 9.

On the other hand, the detection switch button 9a provided in the detection switch 9 so as to project in the placing direction of the main body case 1 when the switch is turned on is pushed in the direction to be pushed into the detection switch 9 (the switch OFF direction) by the end portion of the torsion spring 8 fitted to the main body case 1.

At this time, supposing the spring force of the detection switch button 9a to be F1 and the spring force of the torsion spring 8 to be F2, the relation is F1<F2. A similar function is obtained by using leaf spring or resin lever (with return spring) instead of the torsion spring 8, and pushing the detection switch button 9a.

Figure 3:
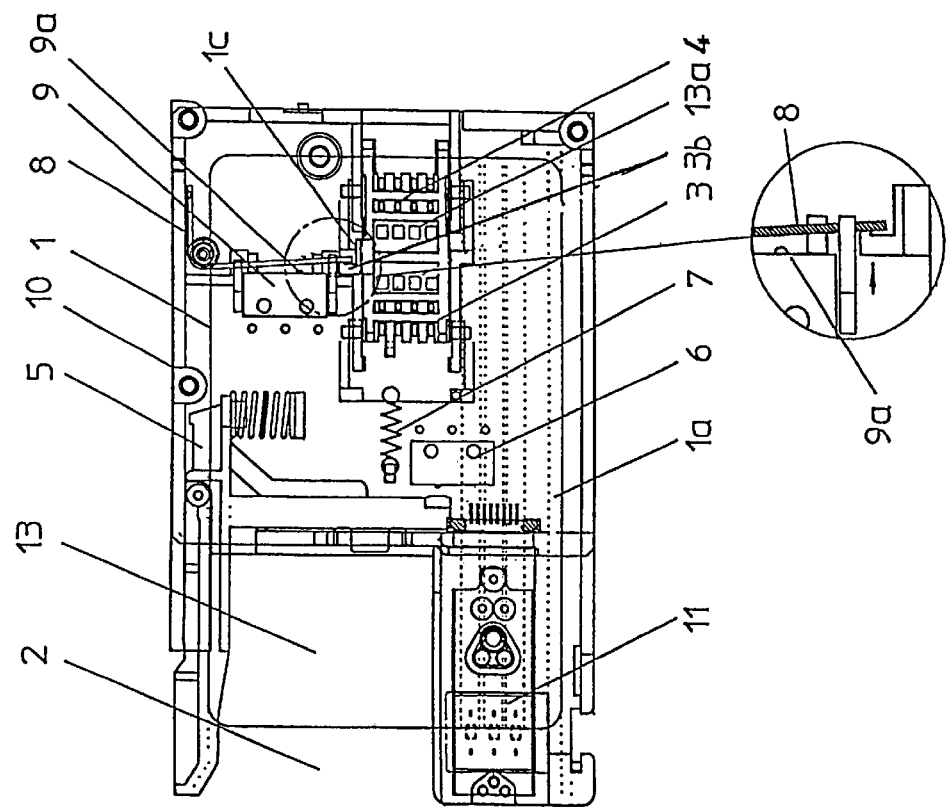
FIG. 3 is a front view showing a state of the IC card reaching the inner depth of the IC card reader in the embodiment of IC card reader of the invention.
Figure 4:
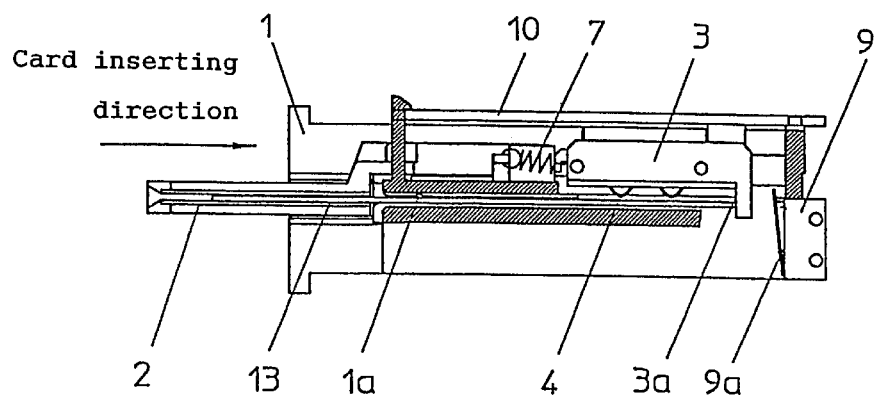
FIG. 4 is a sectional view showing a switch mechanism of a conventional IC card reader.

Or, as shown in FIG. 3, when the IC card 13 is inserted into the inner side of the IC card reader, the switch changeover bump 3b of the IC contact point holder 3 abuts against the end portion of the torsion spring 8 abutting against the detection switch button 9a by force, and moves the torsion spring end portion in a direction departing from the detection switch button 9a, thereby changing over the switch. The switching timing at this time is explained in detail. When the IC card 13 is pushed into the inner side of the IC card reader, the IC card 13 abuts against the contact point holder boss 3a, and lowers the contact point holder 13 while moving to the inner side along the guide grooves 1b and 1c of the main body case. As a result, the contact 4 disposed in the contact point holder 13 abuts against the IC contact point 13a on the IC card 13. When the IC card is further pushed into the inner side, the switch changeover bump 3b of the IC contact point holder abuts against the end portion of the torsion spring 8 which is pushing the detection switch 9a. When the IC card 13 moves further inward, the end portion of the torsion spring 8 is departed from the detection switch button 9a by the move of the switch changeover bump 3b. The moment of release of the detection switch button 9a from the torsion spring 8, the detection switch button 9a automatically resets by the spring in the switch. At this time, the detection switch 9 is turned on, thereby allowing to exchange information between the IC card 13 and the host side. Further, when pulling the IC card 13 out of the IC card reader, the IC contact point holder 3 moves together with the IC card 13. At this time, the end portion of the torsion spring 8 being pushed and deflected by the switch changeover bump 3b returns to the original position, and pushes the detection switch button 9a to turn off the switch. Afterwards, the contact 4 ascends along the guide groove 1c, and is departed from the IC contact point 13a of the IC card 13.

INDUSTRIAL APPLICABILITY

As explained so far, according to the IC card reader of the invention, in cooperation with the motion of the IC contact point holder, the torsion spring pushing the detection switch button is pushed into the inner side, and the detection switch button is released by this action, so that the detection switch is securely turned on or off. Besides, if the IC card switch is inserted quickly, strong impact is not directly transmitted to the detection switch, and the switch is not broken or deviated in position, so that the IC card information can be exchanged securely.

What is claimed is:

1. An IC card reader comprising
   an IC card reader main body having an IC card guide path in which an IC card is inserted,
   an IC contact point holder moveable in the main body in a direction of the guide path and having a holder contact point for contacting with a contact point of the IC card, said holder having a bump,
   a detection switch, and
   an elastic member having an elastic force urged towards said detection switch, said IC contact point holder moveable in the main body and in a direction of the guide path, so that when an IC card is inserted into the main body said bump pushes said elastic member against said elastic force and away from said switch to release the elastic force on said detection switch to cause said switch to transition its state.

2. An IC card reader comprising
   an IC card reader main body having an IC card guide path in which an IC card is inserted,
   an IC contact point holder moveable in the main body in a direction of the guide path and having a holder contact point for contacting with a contact point of the IC card, said holder having a bump,
   a detection switch having a spring loaded switch button, and
   an elastic member having an elastic force urged towards said detection switch to depress said switch button, said IC contact point holder moveable in the main body and in a direction of the guide path, so that when an IC card is inserted into the main body said bump pushes said elastic member against said elastic force and away from said switch so that said spring loaded switch button is released from said elastic force to cause said detection switch to transition its state.

3. The IC card reader of claim 1, wherein the elastic member is not integral with the bump.

* * * * *